United States Patent [19]

Ott

[11] Patent Number: 4,665,496

[45] Date of Patent: May 12, 1987

[54] PROCESS AND APPARATUS FOR THE EVALUATION OF THE PRINTING QUALITY OF A PRINTED PRODUCT BY AN OFFSET PRINTING MACHINE

[75] Inventor: Hans Ott, Regensdorf, Switzerland

[73] Assignee: Gretag Aktiengesellschaft, Regensdorf, Switzerland

[21] Appl. No.: 665,976

[22] Filed: Oct. 29, 1984

[30] Foreign Application Priority Data

Nov. 4, 1983 [CH] Switzerland ........................ 5965/83

[51] Int. Cl.[4] ........................ G01J 3/46; B41F 33/00

[52] U.S. Cl. .................................. 364/526; 101/335; 101/365; 250/559; 364/552

[58] Field of Search ............... 364/519, 525, 526, 552; 101/335, 363, 364, 365, DIG. 24; 356/443-445, 447, 448, 380, 394; 250/559, 571

[56] References Cited

U.S. PATENT DOCUMENTS

| | | | |
|---|---|---|---|
| 3,322,025 | 5/1967 | Dauser | 356/443 |
| 3,958,509 | 5/1976 | Murray et al. . | |
| 4,183,657 | 1/1980 | Ernst et al. | 356/448 |
| 4,210,818 | 7/1980 | Green et al. . | |
| 4,217,648 | 8/1980 | Thurm et al. | 364/526 |
| 4,505,589 | 3/1985 | Ott et al. | 364/526 |
| 4,535,413 | 8/1985 | Shiota et al. | 364/526 |
| 4,553,033 | 11/1985 | Hubble, III | 356/445 |

FOREIGN PATENT DOCUMENTS

| | | |
|---|---|---|
| 0029561 | 11/1980 | European Pat. Off. . |
| 0069572 | 7/1982 | European Pat. Off. . |
| 0096227 | 5/1983 | European Pat. Off. . |
| 2115145 | 1/1983 | United Kingdom . |

*Primary Examiner*—Parshotam S. Lall

*Attorney, Agent, or Firm*—Burns, Doane, Swecker & Mathis

[57] ABSTRACT

Printed products and their respective corresponding printing plates are divided into a plurality of image elements. For each image element the surface coverage is determined by photoelectric measurements; a reference reflectance value is then calculated from these measurements, taking into consideration such parameters as the printing characteristic. These reference reflectance values are compared with the actual reflectance values measured on the printed products and the results of the comparison are evaluated to form a quality measure and to calculate control values for the ink feed devices of the printing machine. In this manner, the use of special color measuring strips may be eliminated.

34 Claims, 3 Drawing Figures

PROCESS AND APPARATUS FOR THE EVALUATION OF THE PRINTING QUALITY OF A PRINTED PRODUCT BY AN OFFSET PRINTING MACHINE

BACKGROUND OF THE INVENTION

The present invention relates to an apparatus and a process for evaluating the printing quality of a printed product produced on an offset printing machine, in which the printed product and a reference are each divided into image elements and photoelectrically measured, in which for each image element, a respective reference reflectance value $R_s$ and an actual reflectance value $R_i$ are determined and the respective reference and actual reflectance values of corresponding image elements compared with each other, and in which a quality measure Q is determined from those comparisons.

The evaluation of print quality and the regulation of ink feed are usually effected by means of standardized color control strips. These control strips, printed together with the products to be printed, are evaluated densitometrically and the ink color values of the printing machine set accordingly. The measurement of the color control strips may take place on the printing machine while it is running by means of so-called machine densitometers, or off-line, for example by means of an automatic scanning densitometer, wherein the control loop in both cases may be open (quality evaluation) or closed (machine regulation) in relation to the inking systems. A representative example of a computer-controlled printing machine having closed control loop is described in U.S. Pat. Nos. 4,200,932 and 3,835,777, among others.

In actual practice, it very frequently occurs, for example for reasons of format, that the use of a color control strip is not possible. In such cases, the quality is usually evaluated by visual means, as before.

More recently, a system has become known (for example from the published U.K. application No. 2 115 145), making possible the machine evaluation of printed products without using color control strips. In this system, the printed products are scanned photoelectrically over the entire image surface, with the measurement thus being performed "in the image." Measurements are effected on the running printing machine by means of a machine densitometer, by image elements. As an optional process, the scanned values of the individual image elements are compared, after special processing, with the processed scanning values of a reference printed product ("0.K. sheet"), and with the aid of the results of this comparison, a quality decision, either "good" or "poor," is made in compliance with certain decision criteria. The decision criteria include such factors as the number of image elements differing by more than a certain tolerance from the corresponding image elements of the reference, the differences of the scanning values summed over selected areas of the image form the corresponsing scanning values of the reference, and the differences summed over certain scanning tracks of the scanning values from the corresponding values of the reference.

"In the image" measurements are also known, from U.S. Pat. Nos. 3,958,509, EP Publ. No. 29561 and EP Publ. No. 69572, among others. In the systems described therein, the surface coverage of printing plates is determined by zones and evaluated for the purpose of manual or machine presetting of the ink feed control elements of the printing machine. However, this involves a single presetting, and there is no quality evaluation of the printed products.

OBJECTS AND BRIEF SUMMARY OF THE INVENTION

Even though the system mentioned above in published U.K. application No. 2 115 145 provides a certain easing of the work, it is capable of improvement in numerous aspects. It is therefore an object of the present invention to refine and improve the machine quality evaluation of printed products produced, in particular, on offset printing machines, whereby the reliability of the quality information obtained is enhanced.

Briefly, a process according to the present invention for evaluating the printing quality of a printed product produced in an offset printing machine includes the steps of: determining, for each printing ink color, the reference reflectance value $R_s$ and the actual reflectance value $R_i$ and comparing them; assigning to each image element at least one of the following associated factors: a perception weighting factor $H_e$ which forms a measurement of the perception of color deviations and a full tone weighting factor $G_e$ which forms a measure of the effect of full tone density on the reflectance (as a function of surface coverage); and weighting the differences between the reference reflectance values $R_s$ and the corresponding actual reflectance values $R_i$ with at least one of the associated factors: perception weight factor $H_e$ and full tone weight factor $G_e$.

Other objects and advantages of the present invention can be recognized by a reference to the appended claims.

BRIEF DESCRIPTION OF THE DRAWINGS

The present invention will become more apparent to one skilled in the art to which it pertains from the following detailed description when read with reference to the drawings, in which.

DETAILED DESCRIPTION

Figure 1:
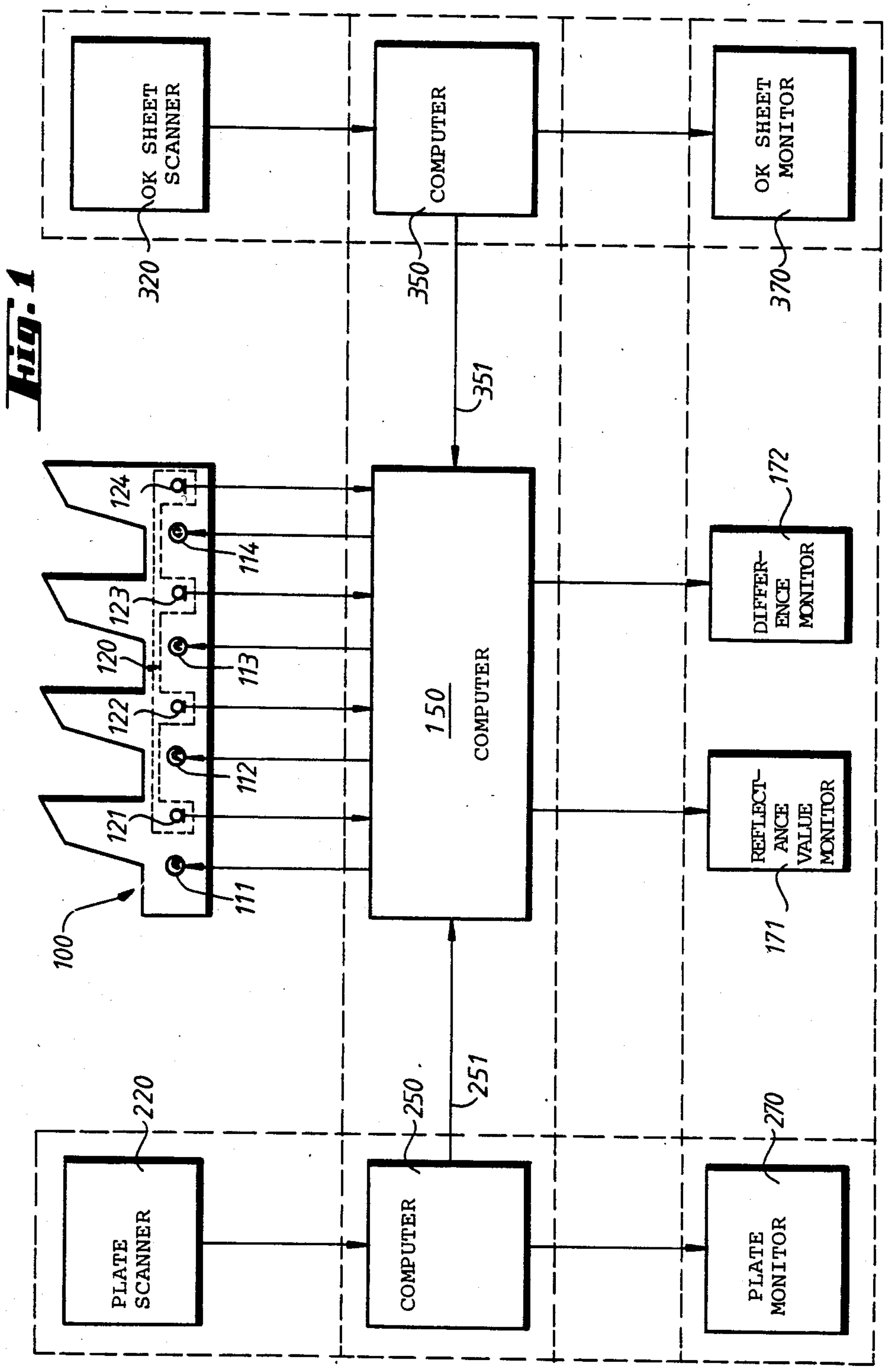
FIG. 1 is a schematic block diagram of an offset printing machine equipped according to the present invention.

The overall installation shown in FIG. 1 includes a four-color offset printing machine 100, three photoelectric scanning devices 120, 220 and 320, three computers 150, 250 and 350 and four optical display devices or monitors 171, 172, 270 and 370.

The offset printing machine 100 is of a conventional design, its ink feed elements 111–114 (ink zone screws) being indicated only symbolically.

Scanning device 120 is known as a "machine densitometer", having four scanning channels 121–124, one for each color of printing inks, and built into the printing machine 100. With scanning device 120, printed products may be measured densitometrically on the printing machine 100 while it is running. Examples of suitable machine densitometers are described in U.S. Pat. Nos. 2,968,988; 3,376,426; 3,835,777; 3,890,048; and 4,003,660, among others. The scanning device 120 shall be designated hereinafter as "machine densitometer 120".

Scanning device 220 is used for the photoelectric measurement of printing plates or of the halftone films (photographic masters) upon which they are based. The scanning device 220 may be a commercially available scanning device ("scanner") such as is used for lithographic film, or any other suitable scanning means, for example according to U.S. Pat. Nos. 4,131,879 and 3,958,509, or European Application Publ. Nos. 69572, 96227 and 29561, whereby it is possible to scan printing plates or halftone films photoelectrically with a resolution as specified in more detail below. Scanning device 220 shall be designated hereinafter as "plate scanner 220," regardless of its type or the object actually scanned.

Scanning device 320 is used, for example, for the photoelectric measurement of printed products found to be qualitatively satisfactory by visual inspection, which satisfactory printed products are known as "proofs" or "OK sheets". This scanning device 320 scans the proofs or OK sheets in exactly the same manner as the machine densitometer 120 scans the printed products, and is therefore designed accordingly. In actual practice OK sheets may be scanned without difficulty, and even advantageously, directly by the machine densitometer 120 in printing machine 100. However, to facilitate comprehension of the present invention, this scanning device, designated hereafter as "OK sheet scanner 320", is shown as a separate element in FIG. 1.

The four optical display units 171, 172, 270 and 370 preferably consist of color television monitors, permitting the graphical display of the measured values or of the data determined by the computers from such values. It is not absolutely necessary to employ four separate display units; they are shown in this fasion only to facilitate comprehension of the present invention. Similarly, the installation could be provided with only a single computer or computing means in place of three, which computer then would then service all of the respective scanning devices and display units connected to it. On the other hand, the plate scanner 220, together with its computer 250 and its display unit 270, and the OK sheet scanner 320, together with its computer 350 and its display unit 370, may also constitute independent units, which then would be connected to the computer 150 by means, for example, of a cable 251 or 351, respectively. All of these embodiments are indicated in FIG. 1 by broken lines. However, these embodiments are not essential to an appreciation of the present invention, and the invention is in no way restricted to them.

Figure 2:
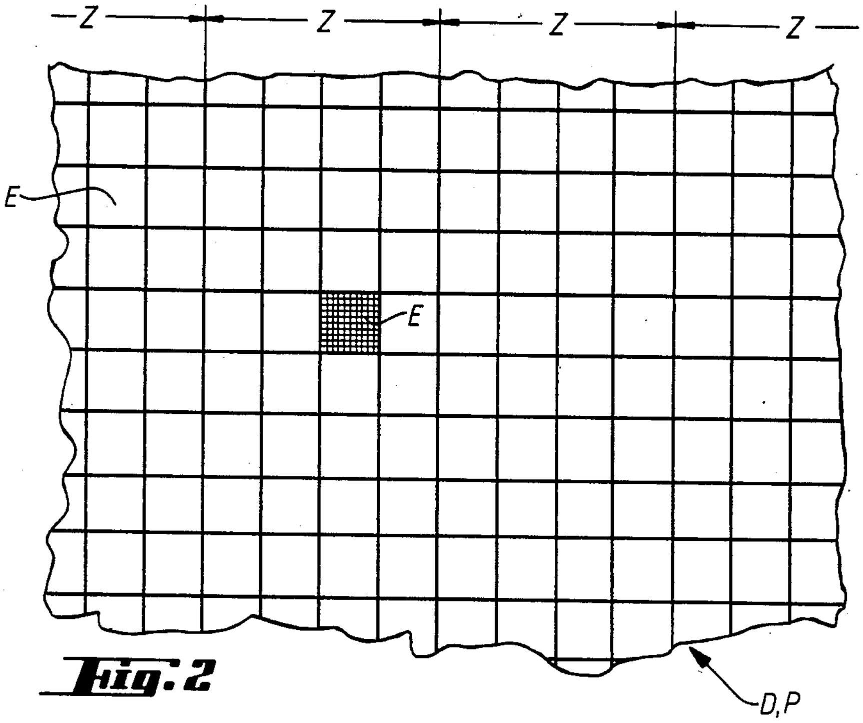
FIG. 2 is a diagram illustrating the print zones and image elements of the measuring method of the present invention.
Figure 3:
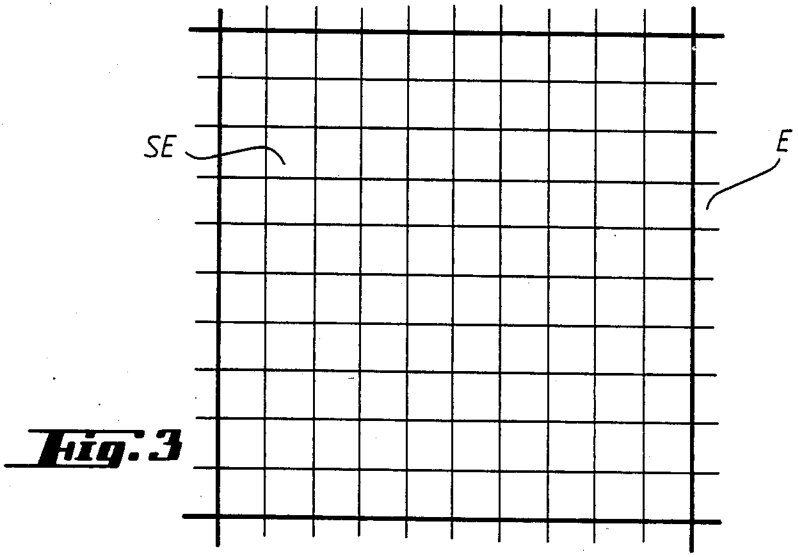
FIG. 3 is an enlarged diagram of an image element of the measuring method of the present invention shown in FIG. 2.

The general mode of operation of the installation shown in FIG. 1 is as follows:

Printed products D (sheets) and the printing plates P upon which they are based are divided in a uniform manner into a plurality of image elements E (FIG. 2). By means of the plate scanner 220 each image element E of the printing plates P (in this case, four plates) is measured photoelectrically, and as explained below, a reference reflectance value $R_s$ is calculated from such measurements, which reflectance value the image element E of the printed products should display for the particular ink concerned, if printing is effected using correctly adjusted ink feeds, etc.

In a similar manner, the printed products D are scanned photoelectrically while the printing machine is running by means of the machine densitometer 120 (or individual sheets are scanned off-line on their own scanning device, for example, an OK sheet scanner 320) and for each color of printing ink and for every image element E an actual reflectance value $R_i$ is determined.

In the computer 150 the individual reference reflectance values $R_s$ and the corresponding actual reflectance values $R_i$ are then compared with each other and information concerning the printing quality (quality measure Q) is obtained from the results of the comparison. If desired, control values (setting values) ST may also be calculated for regulating the ink feed controls 111–114 of the printing machine 100, and thereby the ink feeds.

The display or monitor units 171, 172, 270 and 370 may be used for the graphical display of the scanning values and of the values calculated therefrom. For example, unit 270 may display the surface coverage or the brightness distribution of the individual printing plates P determined from such values; unit 370 may display the brightness distribution of the OK sheets; unit 171 may display the reference reflectance values $R_s$ and the respective actual reflectance values $R_i$; and unit 172 may display their differences. Of course, the display units may also display any other data that may be of interest.

The process according to the present invention is thus based on the recognition that, in offset printing, it is possible under certain conditions to predict the reflectance variation of an image element of the printed product for the respective individual printing ink colors from the surface coverage of the image element involved in the printing plate (or the corresponding halftone film). These conditions include among others, on the one hand the knowledge of the characteristic of the printing machine and the effect of the full-tone density on the reflectance variation as a function of surface coverage, and on the other, that the image elements be adequately small to provide meaningful results.

The printing characteristic, which takes into consideration such effects as paper quality, printing ink, point increment, ink receptivity, overprinting, wet-in-wet printing, etc., may be determined empirically in a relatively simple manner. For this purpose, tables are prepared for the reflectance as a function of the surface coverage of the printing plates, with the tabulated values being obtained by measuring standardized color tables printed under representative conditions on the particular printing machine concerned. To measure such color tables, preferably the same scanning device is utilized that will be used later in actual operation to measure the printed products, and in the present case, is thus the machine densitometer 120.

The effect of full tone density on the variation of reflectance as the result of point increments may also be determined from tables. To produce these tables, the aforementioned color tables are printed under appropriate printing conditions, i.e. with varying full tone density of all printing inks.

To obtain the highest accuracy possible, the image elements E should be made as small as possible. A natural lower limit is set by the halftone fineness (for example 60 lines per cm). In actual practice, however, this lower limit cannot be attained for technical, and especially for economic reasons. This is true particularly for measuring the printed products D with the machine running, in that under these conditions the volume of data obtained using the usual sheet formats cannot be recorded and processed within the time available using an economically justifiable effort. In addition, considerable positioning problems would arise.

For reflectance measurements on a running printing machine, image elements E having individual surface areas of approximately 25 to 400 $mm^2$ are justifiable. In practice an image element E may, for example, have a square shape with a surface area of about 1 $cm^2$. However, with image elements E of this size, the predetermination of reflectances by means of the surface coverages of the printing plate is too inaccurate to take overprinting into account.

According to an important aspect of the present invention, therefore, each individual element E of the printing plates P (or the respective halftone films upon which they are based) is divided into a large number (100 for example) of subelements SE and the surface coverage is determined for each of these subelements. The determination of the surface coverage for the image elements of the printing plates is thus effected with a higher resolution than the determination of the reflectance of the image elements of the printed products. This is readily justifiable, both technically and economically, in that the measurements on the printing plates may be performed on an object at rest, and further, in that only one measurement must be made at a time, and enough time is available in actual practice. The size of the subelements SE may amount to approximately 0.25 to 25 $mm^2$, with a practical example being about 1 $mm^2$ with reference to an image element of approximately 1 $cm^2$. The resolution can be increased by this method by a factor of ten.

The determination of the surface coverage of each individual subelement SE is performed with the aid of the plate scanner 220 in a well-known manner known in itself, for example by measuring the reflectance integrally over the surface area of the subelement or by means of television scanning, or scanning by means of discrete photosensor fields, or the like. For each subelement SE (and of course for each color of printing ink) a subreference reflectance value $RS_s$ is then calculated from the surface coverage by means of the printing characteristic previously determined from tables, and with consideration of overprinting (intermediate tabular values may be found by interpolation). From the individual subreference reflectance values $RS_s$ of each image element E, then, for example by arithmetic averaging, the reference reflectance value $R_s$ of the particular image element E concerned is calculated; reference reflectance values $R_s$ are used for comparison with the corresponding actual reflectance values $R_i$ of the printed products D.

The effect of the full tone density on the point increment depends, as mentioned above, on the surface coverage. According to a further important aspect of the invention, therefore, each subelement SE is assigned a sub-fulltone weighting factor $GS_e$ to take this effect into account. These weighting factors $GS_e$ contain the necessary full tone variation (layer thickness variation) for each printing ink for a particular desired reflection variation, taking into account overprinting and the local surface coverage. The weighting factors $GS_e$ may be determined from tables of full tone variation as a function of change in reflectance. These tables may in turn be determined from the tabular values for the reflectance as a function of full tone density (see the effect of full tone density).

From the sub-full tone weighting factors $GS_e$ of the individual subelements SE of each image element E, a mean full tone weighting factor $G_e$ is determined, for example by arithmetic averaging, for the image elements E involved. These mean full tone weighting factors $G_e$ are then used to determine the weight at which a possible deviation or difference of the actual reflectance value $R_i$ from the reference reflectance value $R_s$ of each individual image element E, is to enter into the calculation of the quality measure Q and the control values ST for regulating the ink feeds. In the formulation of the mean full tone weight factor $G_e$, for example, in the event a large standard deviation exists, the standard deviation may also be taken into consideration in the sense of a reduction of weighting.

It is further possible, in the evaluation of printing quality according to the present invention, to assign to each individual image element E (or even each subelement SE) a perception weighting factor $H_e$ (or sub-perception weighting factor $HS_e$), representing a sensitometric evaluation scale for the reference-actual value deviations or differences. These perception weighting factors may be determined for example in accordance with CIELAB (Comite International de l'Eclairage) from the sensitometric values L*, a*, b* defined therein.

For this evaluation of printing quality, a quality measure Q is then calculated and displayed in an appropriate manner with the aid of the deviations $\Delta_e$ between the measured actual reflectance values $R_i$ and the calculated reference reflectance values $R_s$, for each printing ink. This quality measure Q may be calculated for example by weighting the deviations $\Delta_e$ with at least one of the associated full-tone and perception weighting factors $G_e$ or $H_e$, and adding (integrating) the deviations $\Delta_e$ over one or several selected surface areas of the printed product. The surface areas may be adapted to the particular printed product involved. It is further possible to obtain several quality measures in this manner.

Printing zones Z (FIG. 2) determined by the printing machine 100 play a particular role as surface areas. An additional zone value Zi and a reference zone value Zs are formed from the actual and reference values $R_i$ and $R_s$, respectively. Setting values ST for the ink feed control elements are then determined by comparing the actual zone values with the reference zone values. For the automatic control of the ink feed elements 111–114 of printing machine 100, the control values ST are preferably determined individually for each printing zone, by determining a zone error value $\Delta_z$ summing (integrating) the deviations $\Delta_e$ of the actual reflectance values $R_i$ from the reference reflectance values $R_s$ of the image elements E, weighted with the full tone weighting factors $G_e$, over the entire print zone Z involved. Other evaluation and calculating methods are also possible.

The regulation of the ink feed elements 111–114 on the basis of control values ST is effected in a well-known manner (see for example U.S. Pat. No. 4,200,932) and is not an object of the present invention.

The surface coverages determined by the plate scanner 220 may be integrated over the individual printing zones Z and used, for example as described in U.S. Pat. No. 3,185,088, for presetting the ink feed elements.

As mentioned above, the precalculation of the reference reflectance values $R_s$ of the individual image elements E is effected on the basis of the surface coverages of the corresponding image elements of the individual printing plates P or, if measurements on these plates are not feasible for some reason, of the corresponding halftone films (photographic masters) from which the respective printing plates were prepared.

This is true for making the initial settings and for the startup of the printing machine 100. For the regulation of ongoing printing, however, a printed product judged to be satisfactory, an "OK sheet", OKB, may also be used without difficulty as a basis of comparison. It would then no longer be necessary to scan the latter with the same resolution as the printing plates P, in that in this case, only the reflectances in the individual image elements are of interest. These reflectances may be determined, if not already present in memory, by means of the OK sheet scanner 320 or the plate scanner 220. At least one of the weighting factors $G_e$ and $H_e$ assigned to the individual image elements may be used from the earlier measurements of the printing plates P.

The densitometric measurement of the printed products D on the machine during operation may be effected in numerous ways, as long as it is assured that the reflectance or reflectance variation is detected for each color. It is not absolutely necessary to completely measure each individual printed product D; rather, it is sufficient to perform a sequential measurement of different image elements on successive printed products. Furthermore, for example, each individual ink may be measured behind its respective ink feed device, or the reflectances in the individual colors may be determined together on the finished printed product. Double measurements (made in front of and behind each individual ink feed element) are especially appropriate, as in this manner the effect of each individual ink may be determined in an especially accurate fashion.

It should be mentioned finally that in place of scanning the printing plates or the halftone films, it is also possible to utilize scanning data obtained in the preparation of lithographic films or printing plates.

The principles, preferred embodiments and modes of operation of the present invention have been described in the foregoing specification. The invention which is intended to be protected herein, however, is not to be construed as limited to the particular forms disclosed, since these are to be regarded as illustrative, rather than restrictive. Variations and changes may be made by those skilled in the art without departing from the spirit of the invention.

What is claimed is:

1. A process for evaluating the printing quality of a printed product produced on an offset printing machine having a printing plate prepared from a photographic master, in which the printed product and a reference are each divided into image elements and photoelectrically measured, in which for each image element, a respective reference reflectance value and an actual reflectance value are determined and the respective reference and actual reflectance values of corresponding image elements compared with each other, and in which a quality measure Q is determined from said comparisons, comprising the steps of: determining, for each printing ink color, the reference reflectance value $R_s$ and the actual reflectance value $R_i$ and comparing them; assigning to each image element at least one of the following associated factors: a perception weighting factor $H_e$ which forms a measure of the perception of color deviations, and a full tone weighting factor $G_e$ which forms a measure of the effect of full tone density on the reflectance as a function of surface coverage; and weighting the differences between the reference reflectance values $R_s$ and the corresponding actual reflectance values $R_i$ with said at least one of the associated perception weight factor $H_e$ and full tone weight factor $G_e$.

2. A process according to claim 1, wherein: at least one of the references of the printing plate and the photographic master used in its preparation are utilized as a reference for the respective ink color; and further comprising the steps of determining the surface coverage for each image element of said reference; and calculating the reference reflectance value $R_s$ for each image element E and each printing ink from the surface coverage of the image element involved, taking into consideration at least one of the parameters of the printing process including the printing characteristic and effect of the full tone density.

3. A process according to claim 2, wherein the step of determining the surface coverage for the image elements of the reference is effected with a higher resolution than that obtained by the step of determining the actual reflectance values $R_i$ for the respective image elements of the printed product.

4. A process according to claim 3, wherein the step of determining the surface coverage for the image elements is performed by measuring reflectance by integrating over the surface area of the image elements.

5. A process according to claim 4, wherein the step of determining the surface coverage for the image elements is effected with a resolution ten times greater than that obtained by the step of determining the actual reflectance values $R_i$ for the respective image elements of the printed products.

6. A process according to claim 5, wherein the surface area of the respective image elements ranges from 25 to 400 $mm^2$.

7. A process according to claim 6, wherein the surface area of the respective image elements is approximately 1 $cm^2$.

8. A process according to claim 7, further comprising the step of dividing the image elements into subelements ranging from 0.25 to 25 $mm^2$ in surface area.

9. A process according to claim 8, wherein the image elements are divided into subelements of approximately 1 $mm^2$.

10. A process according to claim 8, further comprising the step of: determining a subreference reflectance value $RS_s$ for each subelement of an image element, taking into consideration important parameters of the printing process; and wherein the respective reference reflectance values $R_s$ of the image elements are determined from all of the respective subreference reflectance values $RS_s$.

11. A process according to claim 10, wherein the reference reflectance value $R_s$ is calculated by averaging the subreference reflectance values $RS_s$.

12. A process according to claim 11, further comprising the steps of: assigning to each subelement at least one of the following factors: a sub-full tone weighting factor $GS_e$ and a sub-perception weighting factor $HS_e$; and calculating at least one of the following factors: a full-tone weighting factor $G_e$ and a perception weighting factor $H_e$, respectively, said calculations being performed by taking respective averages of the assigned sub-full tone weighting factors $GS_e$ and sub-perception weighting factors $HS_e$.

13. A process according to claim 12, wherein each of a plurality of printing zones is defined as a plurality of image elements, and further comprising the steps of: for each printing ink, determining a zone error value $\Delta_z$ from differences $\Delta_e$ between the actual reflectance values $R_i$ and the reference reflectance values $R_s$ of the image elements belonging to a common printing zone by integrating the differences $\Delta_e$, weighted with at least one of the full tone weighting factor $G_e$ and the perception weighting factor $H_e$, over the common print zone; and determining the quality measure Q from the zone error values $\Delta_z$.

14. A process according to claim 1, wherein the reference further include a printed product previously determined to be satisfactory.

15. A process according to claim 14, wherein, for each printing ink the reference reflectance values $R_s$ and at least one of the corresponding full tone and perception weighting factors $G_e$ and $H_e$ of the image elements are determined from the same reference.

16. A process according to claim 14, wherein the reference reflectance values $R_s$ are determined on the basis of a printed product found to be satisfactory, and at least one of the full tone and perception weighting factors $G_e$ and $H_e$ are determined from the printing plates corresponding to respective photographic masters.

17. A process according to claim 14, wherein the step of determining the reflectance values $R_i$ from the printed products is performed by measuring the printed products densitometrically in front of and behind each printing mechanism.

18. A process according to claim 1, wherein the step of determining the reference reflectance value $R_s$ comprises determining surface coverage for the image elements of the reference with a higher resolution than that obtained by the step of determining the actual reflectance values $R_i$ for the respective image elements of the printed product.

19. A process according to claim 18, wherein the step of determining the surface coverage for the image elements is performed by measuring reflectance by integrating over the surface area of the image elements.

20. A process according to claim 19, wherein the step of determining the surface coverage for the image elements is effected with a resolution ten times greater than that obtained by the step of determining the actual reflectance values $R_i$ for the respective image elements of the printed products.

21. A process according to claim 20, wherein the surface area of the respective image elements ranges from 25 to 400 $mm^2$.

22. A process according to claim 21, wherein the surface area of the respective image elements is approximately 1 $cm^2$.

23. A process according to claim 18, further comprising the step of dividing the image elements into subelements having a surface area ranging from 0.25 to 25 $mm^2$.

24. A process according to claim 23, wherein the image elements are divided into subelements having a surface area of approximately 1 $mm^2$.

25. A process according to claim 23, further comprising the step of: determining a subreference reflectance value $RS_s$ for each subelement of an image element, taking into consideration important parameters of the printing process; and wherein the respective reference reflectance values $R_s$ of the image elements are determined from all of the respective subreference reflectance values $RS_s$.

26. A process according to claim 25, wherein the reference reflectance value $R_s$ is calculated by averaging the subreference reflectance values $RS_s$.

27. A process according to claim 25, further comprising the steps of: assigning to each subelement at least one of the following factors: a sub-full tone weighting factor $GS_e$ and a sub-perception weighting factor $HS_e$; and calculating at least one of the following factors: a full-tone weighting factor $G_e$ and a perception weighting factor $H_e$, respectively, said calculation being performed by taking respective averages of the assigned sub-full tone weighting factors $GS_e$ and sub-perception weighting factors $HS_e$.

28. A process according to claim 27, wherein each of a plurality of printing zones is defined by a plurality of image elements, and further comprising the steps of: for each printing ink, determining a zone error value $\Delta_z$ from differences $\Delta_e$ between actual reflectance values $R_i$ and the reference reflectance values $R_s$ of the image elements belonging to a common printing zone, by integrating the differences $\Delta_e$, weighted with at least one of the full tone weighting factor $G_e$ and the perception weighting factor $H_e$, over the common print zone; and determining the quality measure Q from the zone error values $\Delta_z$.

29. An apparatus for evaluating the printing quality of a printed product made on an offset printing machine having means for photoelectrically scanning printed products and a reference, by image elements, and having computing means, connected to said scanning means, for comparing the differences between printed products and the reference, by image elements, and for forming a quality measure from the results of the comparison, wherein the computing means assigns to each image element at least one of the following factors: a perception weighting factor $H_e$, forming a measure of color deviations and a full tone weighting factor $G_e$, describing the effect of full tone density on reflectance as a function of its surface coverage and color, and wherein the computing means further weights the differences between the printed product and the reference with at least one of the associated perception weight factor and full tone weight factor, respectively.

30. A apparatus according to claim 29, further comprising: display means for graphically displaying at least one of the following: the measured reflectances of the reference, the reference reflectance values calculated therefrom, the actual reflectance values of the printed products, and the respective differences between the reference and actual reflectance values, and another quality measure.

31. An apparatus according to claim 29, wherein the scanning means is operable to scan the reference with a higher resolution than that obtained when scanning the printed products.

32. An apparatus according to claim 31, wherein the scanning means is operable to scan a reference in the form of a printing plate photoelectrically, by image elements.

33. An apparatus according to claim 31, further comprising: display means for graphically displaying at least one of the following: the measured reflectances of the reference, the reference reflectance values calculated therefrom, the actual reflectance values of the printed products, and the respective differences between the reference and actual reflectance values, and another quality measure.

34. An offset printing machine, comprising: an apparatus for evaluating the printing quality of a printed product made on said offset printing machine, said apparatus having means for photoelectrically scanning printed products and a reference, by image elements, and having computing means, connected to said scanning means, for comparing the differences between printed products and the reference, by image elements, and for forming a quality measure from the results of the comparison, wherein the computing means assigns to each image element at least one of the following factors: a perception weighting factor $H_e$ forming a measure of color deviations, and a full tone weighting factor $G_e$ describing the effect of full tone density on reflectance as a function of its surface coverage and color, and wherein the computing means further weights the differences between the printed product and the reference with at least one of the associated perception weight factor and full tone weight factor, respectively.

* * * * *